Dec. 25, 1934.  E. M. STARR  1,985,330
WHEEL GAUGE
Filed Oct. 19, 1931   3 Sheets-Sheet 1

INVENTOR
Emil M. Starr,
BY
ATTORNEY

Dec. 25, 1934.                    E. M. STARR                    1,985,330
                                 WHEEL GAUGE
                            Filed Oct. 19, 1931          3 Sheets-Sheet 2
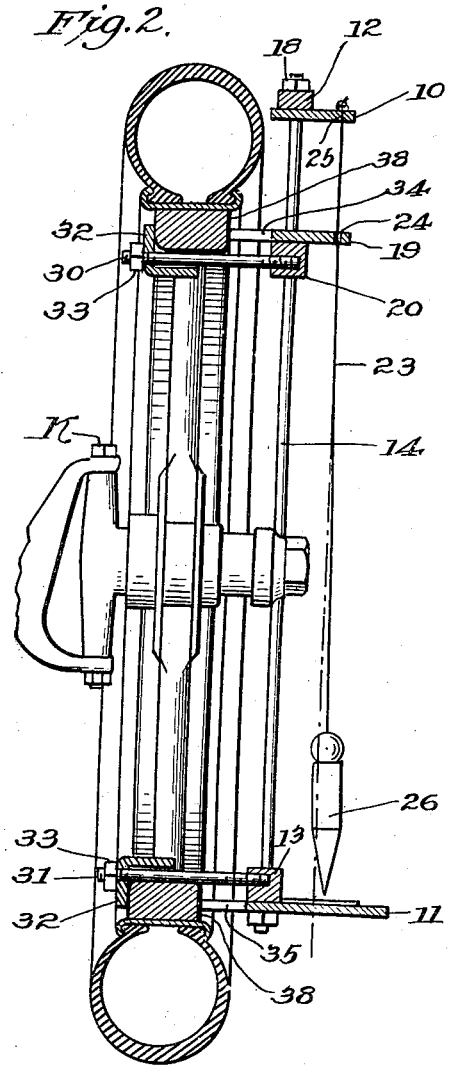
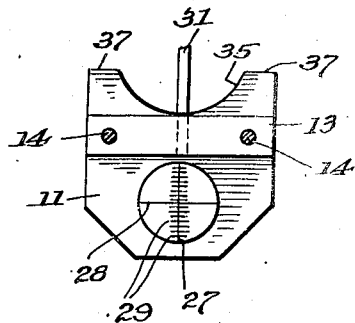
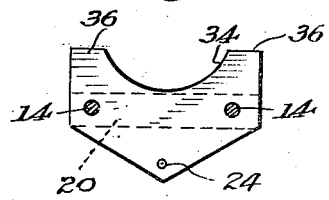
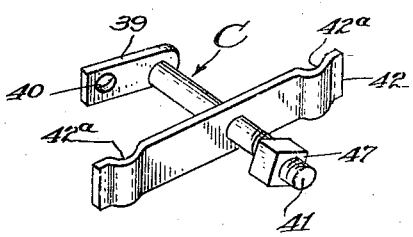
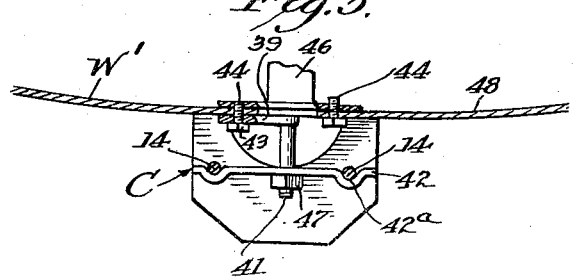
INVENTOR
Emil M. Starr
BY Munn & Co.
ATTORNEY Dec. 25, 1934.    E. M. STARR    1,985,330
WHEEL GAUGE
Filed Oct. 19, 1931    3 Sheets-Sheet 3
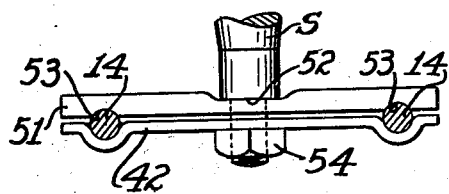
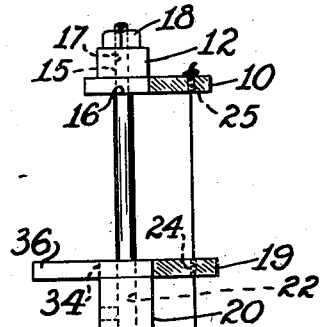
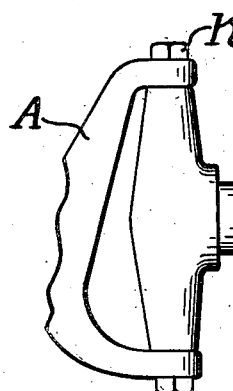
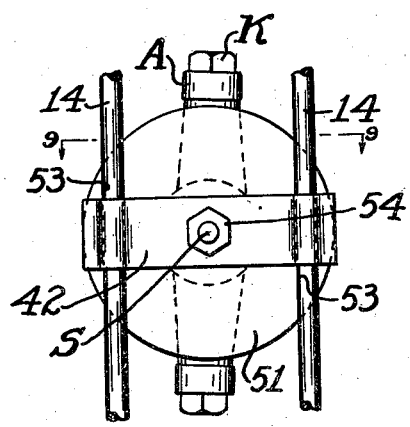
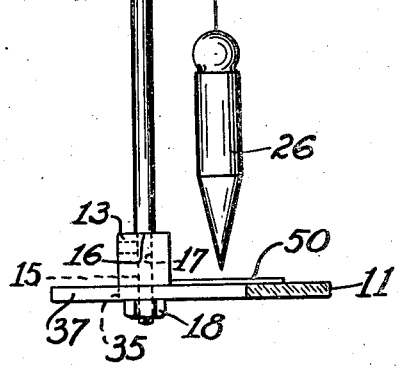
Inventor
*Emil M. Starr*
By *Charles L. Reynolds*
Attorney Patented Dec. 25, 1934

1,985,330

UNITED STATES PATENT OFFICE 1,985,330

WHEEL GAUGE

Emil M. Starr, Pasadena, Calif., assignor to A. E. Feragen, Inc., Seattle, Wash., a corporation of Washington Application October 19, 1931, Serial No. 569,741

29 Claims. (Cl. 33—203)

This application is a continuation in part of my application Serial No. 213,042, filed August 15, 1927.

My invention relates to an instrument used for the purpose of gauging, in angular units, the inclination of the members controlling steering of a vehicle (for instance, the front or steering wheel), by direct application of the gauge to such member, the indicator being controlled by gravity. Such gauging operations are performed in the measurement of the camber of the steering wheels of an automobile, or of the spindle whereon such a wheel is to be mounted, in measuring the caster of the axle, and in the measurement of king-pin inclination.

It is the object of my invention to provide a gauge of the character indicated which may quickly be applied to a wheel or like member, and if the wheel is found to be incorrect, it may be laid aside and necessary correction made—as for instance, by way of bending the axle to correct camber or king-pin inclination, or by inserting tapered shims between the axle and vehicle springs to correct caster—and whereby the instrument may again be applied to the wheel without delay, and the work checked from time to time as it progresses, without delaying the work or of necessity requiring any elaborate preparation or setting up of the gauge.

It is also one of the objects of my invention to provide a gauging instrument of the character indicated above, which may be supported directly upon the wheel, and which may be detachably secured to either wooden or metal spoke wheels, wire spoke wheels, or metal disk wheels, with equal facility and dispatch.

The principles of my invention may be embodied in widely varying forms, but I shall describe these principles as embodied in a simple and convenient form which has been found satisfactory in practice.

Figure 2 is an axial section taken on the line 2—2 of Figure 1 looking in the direction of the arrows.

Figure 1:
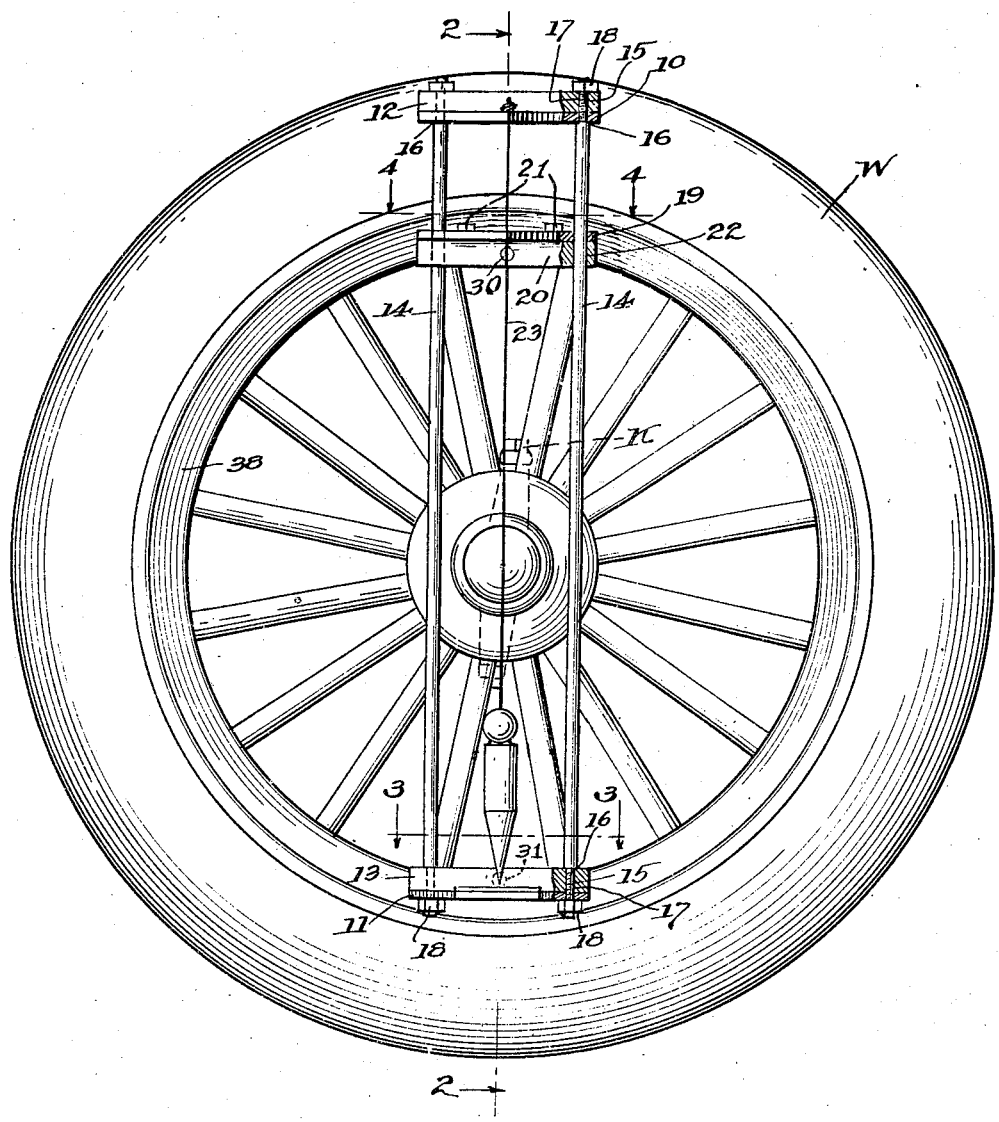
Figure 1 is a view showing, in side elevation, one form of gauging instrument embodying my invention applied to a wheel of the artillery or wooden spoke type.

Figures 3 and 4 are detail sectional views taken respectively on the lines 3—3 and 4—4 of Figure 1.

Figure 5 is a detail sectional view illustrating the manner in which the gauge is secured to a wheel of the metal disk type.

Figure 6 is a detail perspective view of the clamp employed in securing the gauge to a metal disk wheel.

Figure 7 is a side elevation of the gauge applied to the spindle of a front wheel.

Figure 8 is a front elevation of a portion of the gauge, thus applied.

Figure 9 is a horizontal sectional view, taken on the line 9—9 of Figure 8.

My invention embodied in the form illustrated comprises a framework, bar, or mounting generally designated by the numeral 14. Two rods 14 are shown in the present embodiment, connected by a pair of plates 10 and 11, and a pair of bars 12 and 13, one plate and bar being secured at the bottom of the mounting, and the other at the top. To make a rigid connection, the rods 14 may have their ends reduced, as shown at 15, to provide shoulders 16, and the reduced ends 15 extend through registering openings 17 formed in the plates and bars, being threaded to receive nuts 18 to clamp the plates and bars against the shoulders 16. This provides a rigid rectangular frame, and thus connected the projection of each plate from the rods 14, or either of them, is fixed in angle and direction.

A third plate 19, and a third bar 20 secured thereto by bolts 21, (omitted from Fig. 2 for clearness of illustration), are slidably mounted on the mounting thus formed—that is to say, on the rods 14, the two being provided with registering openings 22, within which the rods 14 are received, and permitting the plate 19 and its bar 20 to slide freely up and down these rods, which are rigidly held parallel, as heretofore described. The angle and direction of projection of this plate relative to the rods 14 is thus fixed, similarly to the plates 10 and 11.

An indicator is provided, supported from the mounting, and so held in connection with the plates 19 and 11, or a graduated scale plate 50 supported on the latter, that it will indicate by gravity-controlled means the inclination of the mounting with respect to the vertical. Such an indicator may comprise the plumb bob 26, the supporting cord 23 of which passes without binding through an opening 24 in the adjustable plate 19, and is secured in an opening 25 in the upper plate 10. Thus suspended, the plumb bob 26, when the mounting is vertical, is positioned directly above the intersection of cross lines 27 and 28 upon the scale plate 50, and upon displacement of the mounting from vertical position, the plumb bob will swing with relation to scale marks 29 (and in addition, with respect to the cross lines 27 and 28) to indicate such departure from the vertical.

The adjustable plate 19 and the lower plate 11 are provided with trammel points or fingers 36 and 37 respectively, which may be formed by recessing the inner edge of the respective plates, as indicated at 34 and 35. These points are so disposed and spaced from the rods 14 as to define a plane parallel to the plane of the rods, or bearing some other definite relationship thereto. These trammel points may now be applied to the wheel, for instance, the felloe 38, contacting at opposite sides of a horizontal line through the wheel's axis, and if the points 36 and 37 are equally spaced from the mounting, their contact in one plane with the felloe will cause the mounting to lie in a plane which is parallel to the plane of the felloe (which of course is the plane of the wheel itself), and if the wheel is inclined, as should be the case for proper steering, the inclination, with the gauge thus applied, will be shown by movement of the gravity-controlled indicator—that is, by the swinging of the plumb bob 26 outwardly from the intersection of the cross lines 27 and 28, and the amount of this inclination can be read in the angular units 29. The slidable mounting of the plate 19 on the rods 14 permits adjustment of the plate along the rods to accommodate wheels of different sizes, so that the instrument can be applied to all sizes of wheels with equal facility and dispatch.

With the instrument applied to the wheel W in the manner above described, and with the wheel facing directly forward of the vehicle, any camber existing in the wheel will be visibly and accurately indicated on the scale plate 50, by the position of the pointed end of the plumb bob 26 with respect to the graduations 29, the plumb bob of course maintaining its vertical position at all times and swinging relatively to the mounting from the under side of the plate 19 as a center, an amount directly proportionate to the inclination of the wheel from the vertical. Should the wheel be without camber, the pointed end of the plumb bob 26 will remain directly above the point of intersection of the lines 27 and 28, or, if the wheel should have negative camber, it will lie inside of this intersection.

In the event that the camber of the wheel is found to be incorrect, the axle A would ordinarily be bent, and the instrument may be laid aside during this bending operation and again applied to the wheel in the manner indicated, the bending operations continuing, alternating with gauging operations, until the proper camber is indicated. The mounting should be disposed generally vertical, with relation to its fore-and-aft position, during such a measurement, and this can be determined by the registry of the plumb bob with the line 27, though it may register therewith at different points therealong.

Some operators may prefer that the gauge be attached to the wheel, in order to obviate the necessity of applying the gauge each time and permitting the plumb bob to come to rest, and this is particularly desirable in the measurement of caster, as will be described hereafter. For such purposes, threaded studs 30 and 31 are received in the respective bars 20 and 13, and extend inwardly therefrom between the spokes of the wheel W, and then through openings formed in L-shaped clamping brackets 32, after which nuts 33, threaded on the ends of the studs, clamp the mounting to the wheel felloe. As shown in Fig. 2, the bolt 30 is attached to the bar 20, which latter with the plate 19 is free to slide along the rods 14. The plate 19 and bar 20 are accordingly capable of being adjustably clamped in position inside of the felloe 38, and as before stated, this provides for adjusting the plate 19 relative to the plate 11 different distances apart in accordance with the diameters of different sized wheels, and the aperture 24 determines the point from which the plumb bob line 23 swings relative to such diameter, so that the effective length of the cord or line 23 is thus made adjustable in accordance with the diameter of the wheel to which the device is applied.

If the wheel to be gauged is a disk wheel, the clamp C, shown in Figures 5 and 6, may be employed. The clamp C comprises an L-shaped member constructed to provide an arm 39 having an opening 40 extending therethrough near one end, and a threaded stud 41 projecting from its other end and adapted to extend freely through an opening formed in a strap 42 having a pair of concave recesses 42ª corresponding in spacing to that of the rods 14 of the mounting.

The studs 30 and 31 are not required in cases where it is desirable to secure the instrument to a disk wheel, and if they are in place they are first removed from their respective bars. One of the nuts 43 of the hub bolts 44, for securing the disk wheel W' to its hub 46, is removed, and the arm 39 is applied to the bolt 44, as shown in Figure 5, the nut 43 now being replaced and tightened to secure the member C firmly to the wheel. The strap 42 is now applied to the stud 41 and its recesses 42ª engaged with the rods 14, these being held by the operator with the contact points 36 and 37 applied to the wheel, in the same position as is shown in Figure 1. A nut 47 is then threaded on the stud 41 and tightened until the trammel points 36 and 37 of the plates 19 and 11 respectively are forced into firm engagement with the felloe 48 of the wheel, thus securing the mounting to the disk wheel.

To determine the caster of the axle—that is, the inclination forwardly and downwardly of the king pin K from the vertical—it is desirable, though not essential, that the gauge be secured to the wheel, so that while passing through the straight-ahead position, it will be vertical as seen from the side of the wheel, but will be inclined as the wheel rolls over the inclined king pin when in the forward and in the rearward positions, as will be understood from the following description. Thus, to determine caster, each wheel is turned first right and then left an equal amount (say 30°) from the straight-ahead position. Any caster in the axle will tend to neutralize the camber of the wheel when the wheel lies in a plane in advance of the axle, turned in, and the angular reading will be decreased. When the wheel lies behind the axle, turned out, the caster angle supplements the camber angle and the gauge reading will be increased. The gauge reading turned out, less the gauge reading turned in, gives the caster angle directly, if the wheel has been turned 30° each way. Thus the caster angle for each end of the axle can be determined, and compared to that of the opposite end and to the recognized standard for the particular car under consideration. Should the caster be found incorrect, a shim (not shown) of the proper taper can be inserted between axle A and the springs resting thereon, which constitutes the equivalent of twisting the axle and hence varying the caster, or, if facilities are available, the axle itself may be twisted.

It will be understood that, due to the inclination of the king pin K, the point of the weight 26 may lie rearwardly of the cross line 27 with the wheel turned in, and forwardly thereof with the wheel turned out, but this will not affect the reading with respect to the graduations 29, and it is these readings which give the caster angle by the method just described.

It will be recognized that errors of caster or camber may be due partly or wholly to a bent spindle, worn bushings or wheel bearings, and to various like causes, and that certain errors may creep in because of the mounting of the wheel upon its spindle. In order, therefore, to check caster and camber more directly, it may be desirable to apply the gauge to the spindle instead of to the wheel which is mounted upon that spindle. The gauge need not be changed for this purpose, but it is only necessary to provide a means whereby the gauge, as described, may be mounted upon the spindle itself, and any suitable means for this purpose may be employed.

Thus, as is shown in Figures 7, 8 and 9, a plate 51 may be centrally apertured to be received upon the threaded end of a spindle S, and will seat against a shoulder 52 thereof or will otherwise be positioned in a plane at right angles to the axis of the spindle. It may be grooved, as indicated at 53, to receive the two rods 14, and the strap 42 heretofore described, received now on the threaded end of the spindle and held thereto by the nut 54, cooperates with the plate to clamp the mounting and as a means of applying the same to the spindle in a position which is perpendicular to the spindle's axis. Camber and caster measurements may be made as heretofore described, and corrections for observed errors may likewise be made without disturbing the gauge.

What I claim as my invention is:

1. In combination, a mounting having means for securing it to a steerable vehicle wheel for swinging movement bodily with the wheel as the latter is swung on its king pin, and means carried by the mounting for indicating the inclination of the wheel relative to the vertical.

2. In combination, a mounting having means for detachably supporting it upon a steerable vehicle wheel for swinging movement bodily with the wheel as the latter is swung on its king pin, and means carried by the mounting for visibly indicating the inclination of the wheel.

3. In combination, a mounting having means for detachably securing it to a steerable vehicle wheel for swinging movement bodily with the wheel as the latter is swung on its king pin, a scale plate supported from the mounting, and an indicator carried by the mounting and movable relative thereto over the surface of the scale plate, said indicator constantly acting to maintain a vertical position regardless of the inclination of the wheel from the vertical, so as to indicate on the scale plate the inclination of the wheel.

4. In combination, a mounting having means for detachably applying it to a vehicle wheel for movement bodily therewith, a scale plate fixed to the mounting and provided with graduations, and a plumb bob suspended from the mounting to swing over the graduations of the scale plate and cooperating therewith to indicate the wheel's inclination, in determining the camber of the wheel and the caster of the axle.

5. A gauging instrument comprising a mounting having means for detachably securing it to a vehicle wheel for movement bodily therewith, a scale plate fixed to the mounting, and an indicator depending from a point on the mounting above the scale plate for swinging movement thereover and constantly acting to maintain a vertical position regardless of the inclination of the wheel from the vertical and the deviation from a horizontal plane of the plane of rotation of the wheel about the axis of its king pin during steering movement of the wheel, whereby the amount of inclination of the wheel due either to its camber or the caster of the king pin is adapted to be visibly indicated on the scale plate by said indicator.

6. A gauging instrument comprising a mounting having means for securing it to a vehicle wheel for movement bodily therewith, a dial fixed to the mounting, and means carried by the mounting for movement over the dial and constantly acting to maintain a given position controlled by gravity regardless of the inclination of the wheel from the vertical and the deviation from a horizontal plane of the plane of swing of the wheel about the axis of the king pin during steering movement of the wheel, whereby the inclination of the wheel due either to the camber of the wheel or the caster of the king pin is adapted to be indicated on the dial by said last means.

7. A gauging instrument comprising a mounting, means associated therewith to secure the same to a steerable vehicle wheel for swinging movement bodily with the wheel as the latter is swung on its king pin, and gravity-controlled means carried by the mounting and adapted to indicate the amount of inclination of the wheel relative to the vertical.

8. A gauging instrument comprising a mounting having means by which the mounting is adapted to be detachably applied to a vehicle's front wheel for swinging movement bodily with the wheel as the latter is swung on its king pin, and gravity-controlled means carried by the mounting by which the camber of the wheel, and the inclination of its plane, from which the caster of the axle can be determined, are adapted to be visibly indicated.

9. A gauging instrument comprising a mounting having means by which the mounting is adapted to be detachably secured to a vehicle's front wheel for movement bodily with the latter, a scale plate fixed to the mounting and having two right angular related lines, one at right angles to the plane of the wheel, and graduations extending along that line which is at right angles to the plane of the wheel, and an indicator carried by the mounting for movement over the graduations of the scale plate and gravity-controlled to maintain a vertical position regardless of the inclination of the wheel from the vertical and the deviation from a horizontal plane of rotation of the wheel about the axis of the king pin during steering movement of the wheel, whereby the camber of the wheel and its inclination from which the caster of the axle can be determined, are indicated on the scale plate by said indicator.

10. A gauging instrument comprising a mounting having means by which the mounting is adapted to be detachably secured to a vehicle's front wheel mounted for steering movement on a king pin carried by the axle of the vehicle, a graduated dial fixed to the mounting, and a plumb bob suspended from the mounting and including an indicator movable in a plane above the dial 11. A gauging instrument comprising a mounting including a pair of plates, a bar for each of the plates, a pair of rods disposed in spaced parallel relation and having reduced threaded ends extending through the plates and bars, nuts on the reduced ends of the rods for clamping the plates and bars to the rods and thereby provide a rectangular frame, a third plate and bar secured together and slidably mounted on the rods, a scale plate secured to one of the pair of plates, a plumb bob comprising a weight and a flexible cord secured to the weight and threaded through said third plate and secured to the other of said pair of plates so as to suspend the weight for swinging movement over the scale plate, threaded studs extending laterally from one of the pair of bars and from the third bar, L-shaped clamps on the studs, and nuts threaded on the studs.

12. A gauging instrument comprising a mounting including a pair of plates, a bar for each of the plates, a pair of rods disposed in spaced parallel relation and having reduced threaded ends extending through the plates and bars, nuts on the reduced ends of the rods for clamping the plates and bars to the rods and thereby provide a rectangular frame, a third plate and bar secured together and slidably mounted on the rods, a scale plate secured to one of the pair of plates, a plumb bob, a flexible cord secured to the plumb bob and threaded through said third plate and secured to the other of said pair of plates so as to suspend the plumb bob for swinging movement over the scale plate, and a clamp comprising an L-shaped member comprising a threaded stud and an arm adapted to be secured to a hub bolt of a disk wheel, a strap apertured to receive said stud, and adapted to be engaged with said rods, and a nut threaded on the stud to draw the strap against the rods.

13. A gauging instrument comprising a mounting having means by which the mounting is adapted to be detachably secured to a vehicle's front wheel mounted for steering movement on a king pin carried by the axle of the vehicle, a scale plate fixed to the mounting, and a plumb bob suspended from the mounting for movement over the graduations of the scale, and by which the camber of the wheel and its inclination due to the caster of the king pin are adapted to be indicated on the scale plate, said means by which the mounting is adapted to be secured to the wheel comprising threaded studs secured to the mounting, brackets mounted on the studs, and nuts threaded on the studs and adapted to engage the brackets.

14. A gauging instrument comprising a mounting having means by which the mounting is adapted to be detachably secured to a vehicle's front wheel mounted for steering movement on a king pin carried by the axle of the vehicle, a scale plate fixed to the mounting, and a plumb bob suspended from the mounting for movement over the graduations of the scale, and by which the camber of the wheel and its inclination due to the caster of the king pin are adapted to be indicated on the scale plate, said scale plate having lines disposed in intersecting right angular relation, and graduations in intersecting relation to one of the lines and disposed at opposite sides and parallel to the other of the lines.

15. A gauging instrument comprising a mounting having means by which the mounting is adapted to be detachably secured to a vehicle's front wheel mounted for steering movement on a king pin carried by the axle of the vehicle, a dial fixed to the mounting and having its upper surface graduated, and a plumb bob suspended from the mounting and disposed wholly above the dial for unrestricted movement over the graduations of the dial, to thereby indicate on the dial the camber of the wheel and its inclination due to caster of the king pin.

16. A gauging instrument comprising a mounting, means so engageable with portions of a wheel within the outside diameter of the latter as to fix the position of the mounting relative to the wheel, at one side thereof, a graduated member carried by the mounting, and a gravity-controlled member supported from the mounting for co-action with the graduated member in indicating camber of the wheel and its inclination due to caster of the axle.

17. A wheel gauge of the character described, comprising two contact members spaced to engage a vehicle wheel at opposite sides of a horizontal line through its axis, a frame member connecting said contact members to maintain them relatively fixed in position, and means to indicate the inclination of the wheel relative to the vertical when the gauge is thus applied to it.

18. A wheel gauge of the character described, comprising two contact members spaced to engage a vehicle wheel at opposite sides of a horizontal line through its axis, a connecting member maintaining said contact members relatively fixed in position, and gravity-controlled means carried by said connecting member to indicate the amount of inclination of the wheel relative to the vertical when the contact members are thus engaged therewith.

19. In a wheel gauge of the character described, a rod, means thereon engageable with the wheel to maintain the rod in predetermined relationship to the plane of the wheel, and gravity-controlled means supported from said rod for indicating the amount of inclination of the wheel relative to the vertical.

20. In a wheel gauge of the character described, a rod, means projecting a definite distance therefrom, and engageable with the wheel to hold the rod in parallelism with the plane of the wheel, and gravity-controlled means on said rod for indicating the amount of inclination of the rod relative to the vertical.

21. In a wheel gauge of the character described, a rod, gauge fingers spaced apart on said rod and projecting a definite distance therefrom to engage the wheel at opposite sides of a horizontal line through its axis, to hold the rod in a predetermined position relative to the plane of the wheel, and means on the rod for indicating the inclination of the wheel relative to the vertical.

22. In a wheel gauge of the character described, a rod, gauge fingers spaced apart on said rod and projecting a definite distance therefrom to engage the wheel at opposite sides of a horizontal line through its axis, to hold the rod in a predetermined position relative to the plane of the wheel, and gravity-controlled means on the rod for indicating the inclination of the wheel relative to the vertical.

23. A gauging instrument comprising a mounting, means engageable with a wheel member to fixedly secure the mounting on the wheel at one side thereof, and in definite relationship to its plane, and means carried by the mounting for indicating the inclination of the wheel relative to the vertical.

24. In a gauge of the character described, in combination, a mounting having means for supporting it from a vehicle element in definite relationship to the axis of rotation of a wheel of the vehicle, and means carried by the mounting for indicating the amount of inclination of the wheel's axis relative to the horizontal.

25. In a wheel gauge of the class described, a straight bar, two gauge arms secured to said bar in spaced apart relation for engaging with the rim of a wheel on opposite sides of the hub, one of said gauge arms being forked to prevent sidewise tilting of the bar, said gauge arms holding the bar in a predetermined position relative to the plane of the wheel, and means on the bar for indicating the amount of inclination of the bar relative to the vertical.

26. The method of determining the caster angle of an automobile king pin, which consists in swinging the wheel upon such king pin forward through a known angle from the straight-ahead position, determining the inclination of the wheel's plane from the vertical in such position, swinging the wheel upon the king pin through a known angle rearward of the straight-ahead position, determining the inclination of the wheel's plane from the vertical in such position, and subtracting the inclination swung forward from the inclination swung rearward to arrive at the caster angle.

27. The method of determining the caster angle of an automobile king pin, which consists in swinging the wheel upon such king pin rearward through an angle of 30° from the straight-ahead position, determining the angle of inclination of the wheel's plane from the vertical in such position, swinging the wheel upon the king pin through an angle of 30° forward from the straight-ahead position, determining the angle of inclination of the wheel's plane in such latter position, and subtracting the inclination angle swung forward from the angle swung rearward, to arrive at the caster angle.

28. The method of determining the caster angle of an automobile king pin which consists in swinging the spindle upon such king pin rearward through an angle of 30° from the straight-ahead position, determining an angle corresponding to the change in angle of the spindle's axis in accomplishing such 30° swing, swinging the spindle upon the king pin through an angle of 30° forward from the straight-ahead position, determining an angle corresponding to the change in angle of the spindle's axis in accomplishing the latter 30° swing, and subtracting the latter angle from the former to arrive at the caster angle.

29. The method of determining the angle of the axis of an automobile king pin to the vertical which consists in swinging the spindle mounted upon said king pin through a known horizontal angle from straight-ahead position, in one direction, measuring an angle which is a function of the change of position of such spindle in the swung position, then swinging the spindle through a like horizontal angle from the straight-ahead position, in the opposite direction, measuring an angle corresponding to the first which is a function of the second swung position, and algebraically subtracting the one measured angle from the other in such manner as to give a positive angle, which is a function of the spindle's angle to the vertical.

EMIL M. STARR.